US012683243B2

(12) United States Patent     (10) Patent No.:   US 12,683,243 B2
Yoon et al.            (45) Date of Patent:      Jul. 14, 2026

(54) SEPARATOR HAVING AN INORGANIC LAYER INCLUDING A LOW-DENSITY BINDER WITH IMPROVED ADHESIVE FORCE FOR SECONDARY BATTERIES

(71) Applicant: LG ENERGY SOLUTION, LTD., Seoul (KR)

(72) Inventors: Yeo Ju Yoon, Daejeon (KR); So Mi Jeong, Daejeon (KR); Da Kyung Han, Daejeon (KR); Min Ji Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 662 days.

(21) Appl. No.: 18/017,745

(22) PCT Filed: Jun. 7, 2022

(86) PCT No.: PCT/KR2022/008023
§ 371 (c)(1),
(2) Date: Jan. 24, 2023

(87) PCT Pub. No.: WO2022/260405
PCT Pub. Date: Dec. 15, 2022

(65) Prior Publication Data
US 2023/0299420 A1     Sep. 21, 2023

(30) Foreign Application Priority Data
Jun. 9, 2021    (KR) ........................ 10-2021-0074549

(51) Int. Cl.
*H01M 50/42*     (2021.01)
*H01M 10/052*    (2010.01)
(Continued)

(52) U.S. Cl.
CPC ......... *H01M 50/42* (2021.01); *H01M 10/052* (2013.01); *H01M 50/403* (2021.01);
(Continued)

(58) Field of Classification Search
CPC .. H01M 50/42; H01M 50/403; H01M 50/417; H01M 50/446
(Continued)

(56) References Cited

U.S. PATENT DOCUMENTS

2014/0038046 A1   2/2014   Lee et al.
2014/0045033 A1   2/2014   Zhang et al.
(Continued)

FOREIGN PATENT DOCUMENTS

CN      101158135 A    4/2008
CN      101789499 A    7/2010
(Continued)

OTHER PUBLICATIONS

International Search Report (PCT/ISA/210) issued in PCT/KR2022/008023, dated Sep. 16, 2022.
(Continued)

*Primary Examiner* — Sean P Cullen
(74) *Attorney, Agent, or Firm* — Birch, Stewart, Kolasch & Birch, LLP

(57) ABSTRACT

A separator for a secondary battery having improved force of binding to an electrode, and more particularly a separator for a secondary battery including a porous polymer separator substrate and an inorganic layer on at least one surface of the separator substrate. The inorganic layer includes an inorganic material particles and a binder. The binder is a hollow type binder.

14 Claims, 1 Drawing Sheet

5.0kV 9.3mm x 25.0k SE(M)          2.00µm

(51) Int. Cl.

| | |
|---|---|
| *H01M 50/403* | (2021.01) |
| *H01M 50/417* | (2021.01) |
| *H01M 50/423* | (2021.01) |
| *H01M 50/434* | (2021.01) |
| *H01M 50/446* | (2021.01) |

(52) U.S. Cl.
CPC ....... *H01M 50/417* (2021.01); *H01M 50/423* (2021.01); *H01M 50/434* (2021.01); *H01M 50/446* (2021.01)

(58) Field of Classification Search
USPC .................................. 429/144, 251, 254, 255
See application file for complete search history.

(56)     References Cited

U.S. PATENT DOCUMENTS

| | | | |
|---|---|---|---|
| 2014/0154583 A1 | 6/2014 | Ueki et al. | |
| 2015/0140402 A1 | 5/2015 | Kim et al. | |
| 2015/0155539 A1 | 6/2015 | Park et al. | |
| 2016/0049628 A1 | 2/2016 | Kim et al. | |
| 2016/0149190 A1 | 5/2016 | Fukuchi | |
| 2018/0053963 A1* | 2/2018 | Tanaka .............. | H01M 10/0525 |
| 2019/0144586 A1 | 5/2019 | Ishii et al. | |
| 2020/0176744 A1 | 6/2020 | Zhang et al. | |
| 2022/0255189 A1 | 8/2022 | Lee et al. | |
| 2022/0285787 A1 | 9/2022 | Jeong et al. | |

FOREIGN PATENT DOCUMENTS

| | | | | | |
|---|---|---|---|---|---|
| CN | 109075345 | A | | 12/2018 | |
| CN | 118867570 | A | * | 10/2024 | ............ C08F 112/08 |
| EP | 2 874 202 | A1 | | 5/2015 | |
| JP | 2013-191484 | A | | 9/2013 | |
| JP | 2016072197 | A | * | 5/2016 | |
| JP | 6438725 | B2 | | 12/2018 | |
| JP | 2020-145008 | A | | 9/2020 | |
| JP | 6800279 | B2 | | 12/2020 | |
| KR | 10-2014-0017875 | A | | 2/2014 | |
| KR | 10-1491611 | B1 | | 2/2015 | |
| KR | 10-2015-0035548 | A | | 4/2015 | |
| KR | 10-2015-0042216 | A | | 4/2015 | |
| KR | 10-2016-0020283 | A | | 2/2016 | |
| KR | 10-1721300 | B1 | | 3/2017 | |
| KR | 10-2017-0097577 | A | | 8/2017 | |
| KR | 10-2020-0107602 | A | | 9/2020 | |
| KR | 10-2021-0020798 | A | | 2/2021 | |
| KR | 10-2021-0020845 | A | | 2/2021 | |

OTHER PUBLICATIONS

Extended European Search Report for European Application No. 22820533.2, dated Mar. 31, 2025.

* cited by examiner

SEPARATOR HAVING AN INORGANIC LAYER INCLUDING A LOW-DENSITY BINDER WITH IMPROVED ADHESIVE FORCE FOR SECONDARY BATTERIES

TECHNICAL FIELD

This application claims the benefit of priority to Korean Patent Application No. 2021-0074549 filed on Jun. 9, 2021, the disclosure of which is incorporated herein by reference in its entirety.

The present invention relates to a separator for secondary batteries having improved electrode adhesive force characteristics and a method of manufacturing the separator, and more particularly to a separator having a hollow type binder applied thereto, whereby the force of adhesion between the separator and an electrode is improved.

BACKGROUND ART

A separator in a lithium secondary battery isolates a positive electrode and a negative electrode from each other, thereby preventing physical contact therebetween and thus preventing internal short circuit, and provides a lithium ion movement path through micropores in the separator, and therefore the separator plays a very important role in safety and output characteristics of the battery. A safety reinforced separator with improved safety (hereinafter refer to as an "SRS separator") has been widely used as the separator of the lithium secondary battery. The SRS separator is a separator configured such that a coating layer including an inorganic material and a binder is formed on a polyolefin-based substrate.

The binder is mainly made of a PVDF-based polymer, and the separator is manufactured using a vapor induced phase separation (VIPS) method. An SRS separator that is currently produced uses a PVDF-based binder, and therefore the force of adhesion to a positive electrode is high; however, the force of adhesion to a negative electrode using a styrene-butadiene rubber (SBR)-based binder is low. In addition, since the PVDF-based binder is hydrophobic, wetting characteristics of the separator in an electrolytic solution are poor, and therefore output of the battery is lowered.

Patent Document 1 discloses a separator including a coating layer in a state of not being crosslinked using a coating composition including specific contents of a crosslinkable binder and a non-crosslinkable binder in order to improve the force of adhesion between the separator and an electrode.

The separator includes an inorganic layer disposed on at least one surface of a porous polymer separator substrate, the inorganic layer including an inorganic material and a first binder, and an inorganic adhesive layer located between the separator substrate and the inorganic layer, the inorganic adhesive layer including a second binder configured to improve the force of binding between the separator substrate and the inorganic layer.

Patent Document 2 discloses a separator for lithium secondary batteries having a porous coating layer located on the surface of a porous polymer substrate to improve electrode adhesive force and resistance characteristics, the porous coating layer including inorganic particles and a binder polymer. In Patent Document 2, the PVdF-based binder includes two PVdF binders mixed at a predetermined ratio, as can be seen through X-ray diffraction (XRD) analysis.

Patent Documents 1 and 2 each disclose a separator configured such that inorganic particles and various kinds of resins are mixed with each other and a coating layer is formed on a separator substrate, whereby the force of adhesion to an electrode is improved, and a method of manufacturing the same; however, there are many kinds of binders that are used, several binder layers are included, and the content of the binder is increased.

PRIOR ART DOCUMENTS (Patent Document 1) Korean Patent Application Publication No. 10-2020-0107602

(Patent Document 2) Korean Patent Application Publication No. 10-2021-0020798

DISCLOSURE

Technical Problem

The present invention has been made in view of the above problems, and it is an object of the present invention to provide a separator for secondary batteries configured such that the content of a binder is not increased, whereby the force of adhesion to an electrode is improved while not affecting coating on a separator substrate, and a method of manufacturing the same.

Technical Solution

A separator for a secondary battery according to the present invention to accomplish the above object includes a porous polymer separator substrate and an inorganic layer on at least one surface of the separator substrate, the inorganic layer includes inorganic material particles and a binder, wherein the binder is a hollow type binder.

In the separator for secondary batteries according to the present invention, the hollow type binder may be an aqueous emulsion binder.

In the separator for secondary batteries according to the present invention, the aqueous emulsion binder may be an acrylic-containing binder.

In the separator for secondary batteries according to the present invention, the hollow type binder may have a particle form, and may have a particle size of 550 μm or less.

In the separator for secondary batteries according to the present invention, the hollow type binder may have a density of 0.9 g/mL or less.

In the separator for secondary batteries according to the present invention, the acrylic-containing binder may be at least one selected from the group consisting of acrylamide, ethylene glycol dimethacrylate, and azobisisobutyronitrile.

In the separator for secondary batteries according to the present invention, the percentage of the binder present in the inorganic layer may be 20 weight % or less.

The present invention provides a method of manufacturing a separator for a secondary battery, the method including (S1) manufacturing a slurry having the weight ratio of an organic material to a binder of 8:2 and an amount of solids in the slurry is 30% by weight, (S2) fixing a separator substrate using a bar coater, (S3) applying the slurry manufactured in step (S1) to at least one edge of the separator substrate in a straight line using a pipette, (S4) operating a bar to coat the slurry on the at least one edge of the separator substrate, and (S5) drying the coated slurry, wherein the binder includes a hollow type binder having a density of 0.9 g/mL or less.

In the method of manufacturing the separator for secondary batteries according to the present invention, the hollow type binder may have a particle form, and may have a particle size of 550 μm or less.

In the method of manufacturing the separator for secondary batteries according to the present invention, the hollow type binder may be at least one selected from the group consisting of acrylamide, ethylene glycol dimethacrylate, and azobisisobutyronitrile.

The method of manufacturing the separator for secondary batteries according to the present invention may further include manufacturing a hollow type binder having a density of 0.9 g/mL or less before step (S1).

The present invention provides a battery cell including an electrode assembly including the separator for the secondary battery interposed between a positive electrode and a negative electrode.

In addition, the present invention may provide possible combinations of the above solving means.

Advantageous Effects

As is apparent from the above description, a separator for secondary batteries according to the present invention has an effect in that a hollow type binder having low density is used, whereby coating of a slurry on a separator substrate is easily performed, and the force of adhesion between the manufactured separator and an electrode is improved.

A process of coating the slurry on the separator substrate is simple, and it is not necessary to perform any additional complicated process, which are advantageous in terms of production process and manufacturing cost.

BEST MODE

Figure 1:
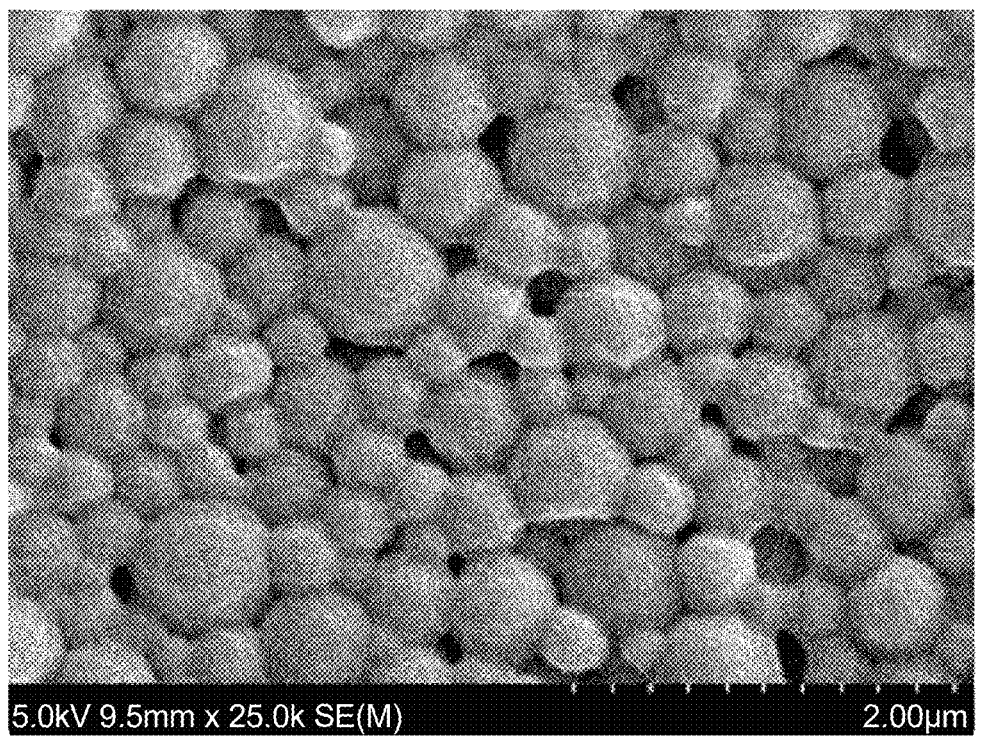
FIG. 1 is an SEM image of a non-hollow type binder according to a conventional method.

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, the present invention will be described in detail.

A separator for secondary batteries according to the present invention is configured to have a structure in which a coating layer is formed on at least one surface of a porous separator substrate, wherein the coating layer includes an aqueous emulsion binder and a fluorine-based non-ionic surfactant as additives.

The separator substrate may be a polyolefin-based separator usually used in the art to which the present invention pertains, and may be made of, for example, at least one selected from the group consisting of high-density polyethylene, low-density polyethylene, linear low-density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naphthalene, and a mixture thereof.

In the present invention, an inorganic layer is formed on one surface or opposite surfaces of the porous separator substrate in the form of a layer. The inorganic layer includes inorganic particles and an aqueous emulsion binder, wherein the inorganic particles and the aqueous emulsion binder may be maintained in a state of being bound to each other, and the inorganic particles may be maintained in a state of being bound to a surface of the separator substrate by the aqueous emulsion binder.

In the present invention, the size of the inorganic particles of the inorganic layer is not limited but may range from 0.001 μm to 10 μm, specifically from 0.05 μm to 5 μm, more specifically from 0.1 μm to 2 μm, in order to form an inorganic layer having a uniform thickness. Dispersibility of the inorganic particles having the above-specified size may be maintained, whereby it is possible to easily adjust physical properties of the separator for secondary batteries and to prevent a phenomenon in which the thickness of the inorganic layer is increased.

The inorganic particles are not particularly restricted as long as the inorganic particles are electrochemically stable. The inorganic particles are not particularly restricted as long as oxidation and/or reduction do not occur within an operating voltage range of an electrochemical device to which the inorganic particles are applied. In particular, when inorganic particles having ion transfer ability are used, ionic conductivity in the electrochemical device is increased, which is advantageous to performance improvement.

In the present invention, the inorganic material may be at least one selected from the group consisting of $BaTiO_3$, $Pb(Zr,Ti)O_3$ (PZT), $Pb_{1-x}La_xZr_{1-y}Ti_yO_3$ (PLZT) ($0<x<1$, $0<y<1$), $PB(Mg_3Nb_{2/3})O_3$—$PbTiO_3$ (PMN-PT), hafnia ($H_fO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, $(LiAlTiP)_xO_y$-based glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, 0<z<4), $P_2S_5$-based glass ($Li_xP_yS_z$, 0<x<3, 0<y<3, 0<z<7), and a mixture thereof. However, the present invention is not limited thereto.

The aqueous emulsion binder according to the present invention may constitute the coating layer of the separator together with the inorganic material, wherein the aqueous emulsion binder may maintain binding between the inorganic particles and may improve the force of adhesion between an electrode and the separator.

For example, the aqueous emulsion binder may be an acrylate-based binder and may have an average particle size of 550 μm or less.

In addition, the kind of the aqueous emulsion binder is not particularly restricted as long as the aqueous emulsion binder does not chemically change the coating layer of the separator. For example, the aqueous emulsion binder may be made of polyolefin, such as polyethylene or polypropylene; a fluorine-containing resin, such as polyvinylidene fluoride or polytetrafluoroethylene; fluorine-containing rubber, such as a vinylidene fluoride-hexafluoropropylene-tetrafluoro-ethylene copolymer or an ethylene-tetrafluoroethylene copolymer; a styrene-butadiene copolymer and a hydride thereof; a (meth)acrylic acid ester copolymer, such as a methacrylic acid ester copolymer, an acrylonitrile acrylic acid ester copolymer, or a styrene acrylic acid ester copolymer; rubber, such as ethylene propylene rubber; polyvinyl acetate; a resin having a melting point or a glass transition temperature of 180° C. or higher, such as polyphenylene ether, polysulfone, polyethersulfone, polyphenylene sulfide, polyetherimide, polyamide, polyimide, polyamide imide, polyetheramide, polyester, aromatic polyester, or polyetheretherketone; polycarbonate; polyacetal; a water soluble resin, such as carboxyalkyl cellulose, alkyl cellulose, hydroxyalkyl cellulose, starch, polyvinyl alcohol, sodium alginate, polyethylene glycol, cellulose ester, polyacrylic acid, polyacrylic amide, or polymethacrylic acid; or a copolymer including two or more thereof.

In the present invention, the aqueous emulsion binder may be manufactured by dissolving at least one selected from the group consisting of acrylamide, ethylene glycol dimethacrylate, and azobisisobutyronitrile in acetonitrile, which will be described in detail when describing a manufacturing method, a description of which will follow.

In the separator for secondary batteries according to the present invention, an additive may be included in the coating layer, wherein the additive may be a fluorine-based non-ionic surfactant.

Conventionally, various kinds of surfactants are known. For example, there are a non-ionic surfactant having an alkyl group as a hydrophobic structural unit, a fluorine-based anionic surfactant including sulfonate as a hydrophobic structural unit, which is one of fluorine-based surfactants having a fluorine atom as a hydrophobic structural unit, and an anionic surfactant, such as quaternary ammonium salt. However, these surfactants have no effect of reducing resistance in a battery; rather, the surfactants have a nature to increase resistance in the battery.

The fluorine-based non-ionic surfactant may be, for example, a fluoroalkyl ethylene oxide appendage, a fluoroalkenyl ethylene oxide appendage, a fluoroalkyl propylene oxide appendage, a fluoroalkenyl propylene oxide appendage, a perfluoroalkyl ethylene oxide appendage, or a perfluoroalkenyl ethylene oxide appendage.

In addition, the present invention provides a battery cell including an electrode assembly configured such that the separator for secondary batteries is interposed between a positive electrode and a negative electrode; wherein the battery cell may be a lithium secondary battery configured to have a structure in which an electrode assembly is impregnated with a non-aqueous electrolytic solution containing lithium salt.

The positive electrode may be manufactured, for example, by applying a positive electrode mixture including a positive electrode active material to a positive electrode current collector and drying the positive electrode mixture. A binder, a conductive agent, and a filler may be optionally further added to the positive electrode mixture, as needed.

The positive electrode current collector is generally manufactured so as to have a thickness of 3 μm to 500 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion to the positive electrode active material. The positive electrode current collector may be configured in any of various forms, such as a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and 0.01≤y≤0.7); a lithium nickel cobalt manganese composite oxide represented by the chemical formula $Li_{1+z}Ni_bMn_cCo_{1-(b+c+d)}M_dO_{(2-e)}A_e$ (where −0.5≤z≤0.5, 0.1≤b≤0.8, 0.1≤c≤0.8, 0≤d≤0.2, 0≤e≤0.2, b+c+d<1, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or an olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, −0.5≤x≤0.5, 0≤y≤0.5, and 0≤z≤0.1).

The conductive agent is generally added so that the conductive agent accounts for 1 weight % to 30 weight % based on the total weight of the mixture including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as acetylene black, Ketjenblack®, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or a conductive material, such as a polyphenylene derivative, may be used as the conductive agent.

The binder is a component assisting in binding between the active material and the conductive agent and in binding with the current collector. The binder is generally added in an amount of 1 weight % to 30 weight % based on the total weight of the mixture including the positive electrode active material. As examples of the binder, there may be used polyvinylidene fluoride, polyvinyl alcohol, carboxymethyl-cellulose (CMC), starch, hydroxypropylcellulose, regenerated cellulose, polyvinylpyrrolidone, tetrafluoroethylene, polyethylene, polypropylene, ethylene-propylene-diene terpolymer, sulfonated ethylene-propylene-diene terpolymer, styrene butadiene rubber, fluoro rubber, and various copolymers.

The filler is an optional component used to inhibit expansion of the electrode. There is no particular limit to the filler as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

The negative electrode may be manufactured, for example, by applying a negative electrode mixture including a negative electrode active material to a negative electrode current collector and drying the negative electrode mixture. The above-described components, such as the conductive agent, the binder, and the filler, may be included in the negative electrode mixture, as needed.

The negative electrode current collector is generally manufactured so as to have a thickness of 3 μm to 500 μm. The negative electrode current collector is not particularly restricted as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase binding force of the negative electrode active material, in the same manner as the positive electrode current collector. The negative electrode current collector may be configured in any of various forms, such as a film, a sheet, a foil, a net, a porous body, a foam body, and a non-woven fabric body. As the negative electrode active material, for example, there may be used carbon, such as non-graphitizing carbon or graphite-based carbon; a metal composite oxide, such as $Li_xFe_2O_3$ ($0 \leq x \leq 1$), $Li_xWO_2$ ($10 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 < x \leq 1$; $1 \leq y \leq 3$; $1 \leq z \leq 8$); lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material. The binder, the conductive agent, and components added as needed are the same as in description of the positive electrode.

Depending on circumstances, a filler may be optionally added as a component that inhibits expansion of the negative electrode. There is no particular limit to the filler as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

In addition, other components, such as a viscosity modifier and an adhesion promoter, may be further included optionally or in combination of two or more thereof.

The viscosity modifier is a component that adjusts viscosity of the electrode mixture such that a process of mixing the electrode mixture and a process of applying the electrode mixture onto the current collector are easily performed. The viscosity modifier may be added so as to account for up to 30 weight % based on the total weight of the negative electrode mixture. Carboxymethyl cellulose or polyvinylidene fluoride may be used as an example of the viscosity modifier. However, the present invention is not limited thereto. Depending on circumstances, the above-described solvent may also serve as the viscosity modifier.

The adhesion promoter is an auxiliary component that is added in order to increase force of adhesion of the active material to the current collector, and may be added so as to account for 10 weight % or less, compared to the binder. For example, oxalic acid, adipic acid, formic acid, an acrylic acid derivative, or an itaconic acid derivative may be used as the adhesion promoter.

Hereinafter, the present invention will be described with reference to the following examples. These examples are provided only for easier understanding of the present invention and should not be construed as limiting the scope of the present invention.

<Manufacture of Non-Hollow Type Aqueous Emulsion Binder>

20 ml of a monomer and 200 ml of water are introduced into a container and are stirred at 300 rpm. Heating is performed in a reflux for three minutes, 0.2 g of potassium persulfate is added, reaction is performed for two hours, and the reaction is finished. After the reaction is finished, centrifugation is performed, and separated solid matter is washed with alcohol.

<Manufacture of Hollow Type Aqueous Emulsion Binder>

6.0 mM of acrylamide (AA), 24 mM of ethylene glycol dimethacrylate (EGDMA), and 10 mg of azobisisobutyronitrile (AIBN) are dissolved in 50 ml of acetonitrile.

Carboxyl-capping polystyrene beads are introduced into the mixed solution and are stirred at 700 rpm.

Reaction is performed at a temperature of 43° C. for 12 hours, and then reaction is performed at a temperature of 60° C. for 24 hours.

Subsequently, aging is performed at a temperature of 85° C. for six hours, centrifugation is performed, and separated solid matter is washed with alcohol.

For the washed solid matter, potassium persulfate is dissolved using THF to manufacture a hollow type binder.

The same hollow type aqueous emulsion binder as the above was manufactured twice, whereby hollow type aqueous emulsion binder 1 and hollow type aqueous emulsion binder 2 were prepared.

Figure 2:
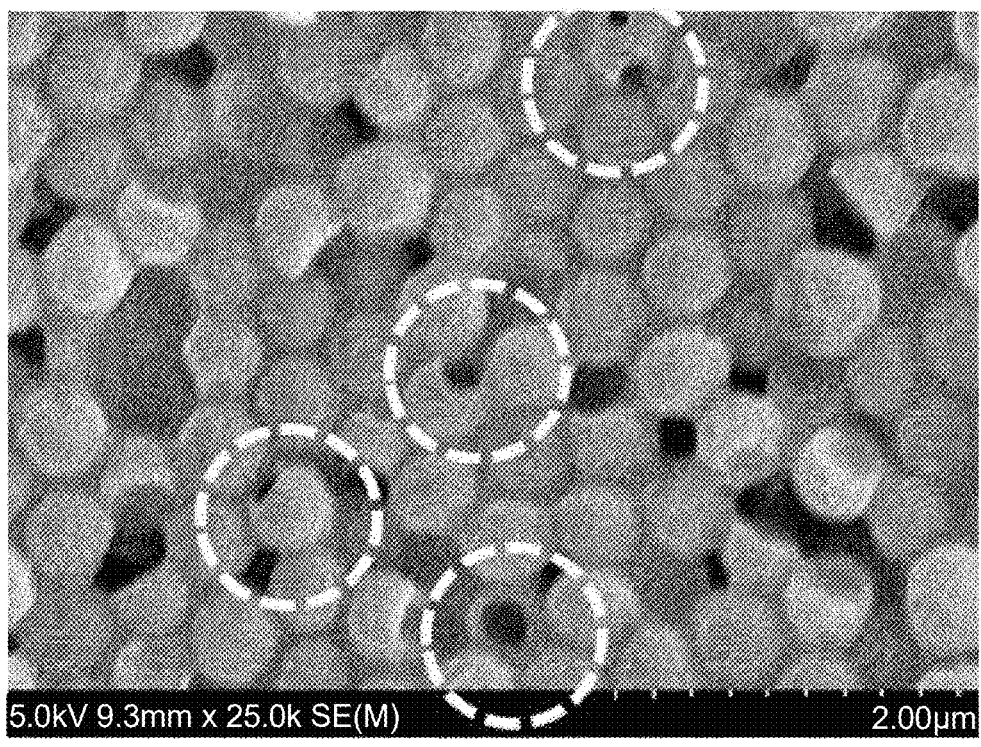
FIG. 2 is an SEM image of a hollow type binder according to the present invention.

FIG. 1 is an SEM image of a non-hollow type binder according to a conventional method, and FIG. 2 is an SEM image of a hollow type binder according to the present invention.

The particle sizes and densities of the non-hollow type binder according to the conventional method and the hollow type binder according to the present invention are shown in Table 1 below.

TABLE 1

| Binder type | Average particle size (μm) | Density (g/ml) |
|---|---|---|
| Non-hollow type aqueous emulsion binder | 588 | 1.0049 |
| Hollow type aqueous emulsion binder 1 | 544 | 0.8453 |
| Hollow type aqueous emulsion binder 2 | 512 | 0.7268 |

<Manufacture of Slurry>

As an inorganic layer to be applied to the porous separator substrate, an inorganic material, a solvent, a dispersant, and zirconia beads are mixed with each other for two hours, an aqueous emulsion binder is added to the mixture, and mixing is performed. Here, on the assumption that the total amount of the aqueous emulsion binder is 100 weight %, the weight ratio of the inorganic material to the aqueous emulsion binder is 8:2, and the content of solids in the final slurry is 30%. Here, the solvent may be water.

Example 1

A wet polypropylene separator substrate is fixed on a bar coater, and a slurry using manufactured hollow type aqueous emulsion binder 1 is applied to an edge of the separator substrate in a straight line using a pipette. Subsequently, a bar is operated to uniformly apply the slurry to the separator substrate. The applied slurry was dried to manufacture a separator for secondary batteries having a coating layer thickness of 15.2 μm. Here, the slurry may be applied to one surface or opposite surfaces of the separator substrate.

Example 2

A separator for secondary batteries was manufactured using the same method as in Example 1 except that the thickness of the coating layer was 13.3 μm.

Example 3

A separator for secondary batteries was manufactured using the same method as in Example 1 except that hollow type aqueous emulsion binder 2 was used and the thickness of the coating layer was 15.1 μm.

Example 4

A separator for secondary batteries was manufactured using the same method as in Example 3 except that the thickness of the coating layer was 13.2 μm.

Comparative Example 1

A separator for secondary batteries was manufactured using the same method as in Example 1 except that a non-hollow type aqueous emulsion binder was used and the thickness of the coating layer was 15.4 μm.

Comparative Example 2

A separator for secondary batteries was manufactured using the same method as in Comparative Example 1 except that the thickness of the coating layer was 13.2 μm.

Method of Measuring Force of Adhesion Between Separator and Electrode

The separator having formed thereon the coating layer according to each of Comparative Examples and Examples of the present invention is punched so as to have a size of 2.5 cm×7 cm, a negative electrode is punched so as to have a size of 2.5 cm×6 cm, the surface of the separator on which the coating layer is formed and the negative electrode are disposed so as to overlap each other while facing each other, and the separator and the negative electrode are brought into tight contact with each other using a hot press at a temperature of 60° C. and at a pressure of 6.5 MPa for one second such that the separator and the negative electrode are attached to each other. The separator-negative electrode sample was attached to a glass slide having a double-sided tape attached thereto in parallel to each other.

The attached sample was mounted to a UTM (LLOYD Instruments, AMETE Company), a 180-degree peeling test was performed at a peeling speed of 300 mm/min at room temperature to measure the force of adhesion of the separator-negative electrode sample. The results are shown in Table 2 below.

Air Permeability Measurement Method

The separator according to each of Comparative Examples and Examples of the present invention was punched so as to have a size of 5 cm×5 cm, and time taken for 100 cc of gas to pass through the separator was measured using an Oken-type air permeability measurement instrument EG01-55-1MR (Asahi Seiko Company). The results are shown in Table 2 below.

TABLE 2

| | Separator substrate | Coating type | Binder density (g/ml) | Thickness (μm) | Solids in resin solution (%) | Coating loading (g/m²) | Air permeability (sec/100 cc) | Force of adhesion between electrode and separator (gf/25 mm @60° C., 6.5 MPa) |
|---|---|---|---|---|---|---|---|---|
| Comparative Example 1 | Wet PP | Non-hollow type aqueous emulsion binder | 1.0049 | 15.4 | 10% | 7.59 | 130 | 91 |

TABLE 2-continued

| | Separator substrate | Coating type | Binder density (g/ml) | Thickness (μm) | Solids in resin solution (%) | Coating loading (g/m²) | Air permeability (sec/100 cc) | Force of adhesion between electrode and separator (gf/25 mm @60° C., 6.5 MPa) |
|---|---|---|---|---|---|---|---|---|
| Comparative Example 2 | Wet PP | Non-hollow type aqueous emulsion binder | 1.0049 | 13.2 | 7% | 6.37 | 121 | 79 |
| Example 1 | Wet PP | Hollow type aqueous emulsion binder 1 | 0.8453 | 15.2 | 10% | 7.44 | 122 | 134 |
| Example 2 | Wet PP | Hollow type aqueous emulsion binder 1 | 0.8453 | 13.3 | 6% | 6.10 | 119 | 102 |
| Example 3 | Wet PP | Hollow type aqueous emulsion binder 2 | 0.7268 | 15.1 | 10% | 7.23 | 123 | 150 |
| Example 4 | Wet PP | Hollow type aqueous emulsion binder 2 | 0.7268 | 13.2 | 7% | 6.81 | 117 | 143 |

Those skilled in the art to which the present invention pertains will appreciate that various applications and modifications are possible within the category of the present invention based on the above description.

The invention claimed is:

1. A separator for a secondary battery, the separator comprising
a porous polymer separator substrate; and
an inorganic layer on at least one surface of the separator substrate,
wherein the inorganic layer comprises inorganic material particles and a binder, and
wherein the binder is a hollow binder having a density of less than 0.9 g/mL.

2. The separator according to claim 1,
wherein the hollow binder has a particle form, and has a particle size of 550 pm or less.

3. The separator according to claim 1, wherein a percentage of the binder present in the inorganic layer is 20 weight % or less.

4. The separator according to claim 1, wherein the density of the hollow binder is 0.8453 g/mL or less.

5. The separator according to claim 1, wherein the density of the hollow binder is in a range of 0.7268 g/mL to 0.8453 g/mL.

6. The separator according to claim 1, wherein the acrylic-containing binder comprises acrylamide, ethylene glycol dimethacrylate, and azobisisobutyronitrile.

7. The separator according to claim 1, wherein the hollow binder is an aqueous emulsion binder.

8. The separator according to claim 7, wherein the aqueous emulsion binder is an acrylic-containing binder.

9. The separator according to claim 8, wherein the acrylic-containing binder is at least one selected from a group consisting of acrylamide, ethylene glycol dimethacrylate, and azobisisobutyronitrile.

10. A battery cell, comprising an electrode assembly comprising the separator for the secondary battery according to claim 1 interposed between a positive electrode and a negative electrode.

11. A method of manufacturing the separator for a secondary battery according to claim 1, the method comprising:
(S1) manufacturing a slurry having a weight ratio of an organic material to the hollow binder of 8:2 and an amount of solids in the slurry is 30% by weight;
(S2) fixing the separator substrate using a bar coater;
(S3) applying the slurry manufactured in step (S1) to at least one edge of the separator substrate in a straight line using a pipette;
(S4) operating a bar to coat the slurry on the at least one edge of the separator substrate; and
(S5) drying the coated slurry.

12. The method according to claim 11, wherein the hollow binder has a particle form, and has a particle size of 550 μm or less.

13. The method according to claim 11, wherein the hollow binder is at least one selected from a group consisting of acrylamide, ethylene glycol dimethacrylate, and azobisisobutyronitrile.

14. The method according to claim 11, further comprising manufacturing the hollow binder before step (S1).

* * * * *